(12) United States Patent
Anand

(10) Patent No.: US 12,713,244 B2
(45) Date of Patent: Aug. 18, 2026

(54) SYSTEMS AND METHODS FOR A MULTIPLE MESSAGING SERVICE MANAGEMENT (MMSM) GATEWAY SEPARATING DIFFERENT TYPES OF WIRELESS NETWORK TRAFFIC FOR LAW ENFORCEMENT INTERCEPTION

(71) Applicant: Boost SubscriberCo L.L.C., Englewood, CO (US)

(72) Inventor: Sudir Anand, Cincinnati, OH (US)

(73) Assignee: Boost SubscriberCo L.L.C., Englewood, CO (US)

( * ) Notice: Subject to any disclaimer, the term of this patent is extended or adjusted under 35 U.S.C. 154(b) by 288 days.

(21) Appl. No.: 18/654,859

(22) Filed: May 3, 2024

(65) Prior Publication Data

US 2025/0016571 A1 Jan. 9, 2025

Related U.S. Application Data

(60) Provisional application No. 63/525,524, filed on Jul. 7, 2023.

(51) Int. Cl.
*H04W 12/80* (2021.01)
*H04W 4/12* (2009.01)

(52) U.S. Cl.
CPC ............. *H04W 12/80* (2021.01); *H04W 4/12* (2013.01)

(58) Field of Classification Search
CPC ................................ H04W 12/80; H04W 4/12
See application file for complete search history.

(56) References Cited

U.S. PATENT DOCUMENTS

2023/0224336 A1* 7/2023 Hoffpauir, IV ..... H04L 63/0428 726/13

OTHER PUBLICATIONS

Tomikas, "What's an SMS Aggregator, and How Does it Aid SMS Delivery?" Messente Blog, Online << https://messente.com/blog/sms-aggregator >>, Published on Nov. 7, 2022, Updated on Jan. 29, 2024, 9 pages.

(Continued)

*Primary Examiner* — Curtis B Odom
(74) *Attorney, Agent, or Firm* — Jeremiah J. Baunach; Frontier IP Law PLLC

(57) ABSTRACT

A Multiple Messaging Service Management (MMSM) gateway (e.g., a Short Message Peer-to-Peer (SMPP) gateway), when receiving SMS and Multimedia Message Service (MMS) communications, determines whether users sending or receiving such communications are subjects (i.e., targets) of a law enforcement agency data intercept request. The MMSM gateway electronically separates out of the communications voice data, text data, image data and/or video data from the communications. In response to determining that the user sending and/or the user receiving the communication is the subject of at least one of the law enforcement agency data intercept requests, the MMSM gateway sends the separated-out voice data, text data, image data and/or video data to one or more law enforcement agencies associated with the applicable law enforcement agency data intercept request. The MMSM gateway may send a separate feed to the law enforcement agency for the SMS traffic and for the MMS traffic.

20 Claims, 7 Drawing Sheets

(56) References Cited

OTHER PUBLICATIONS

Wilkinson, "What Is an SMS Aggregator?" Definitions, Online <<https://simpletexting.com/blog/what-is-an-sms-aggregator/>>, May 15, 2020, 7 pages.

"SMS Gateways," Melrose Labs, Online <<https://smpp.org/sms-gateway.html>>, Copyright 2019-2024, 3 pages.

"Multimedia Messaging Service," Wikipedia, Online <<https://en.wikipedia.org/w/index.php?title-Multimedia_Messaging_Service&oldid=1212749145>>, Last edited on Mar. 9, 2024, 5 pages.

"Lawful interception," Wikipedia, Online <<https://en.wikipedia.org/wiki/Lawful_interception>>, Last edited on Mar. 14, 2024, 10 pages.

"Communications Assistance for Law Enforcement Act," Federal Communications Commission, Online <<https://www.fcc.gov/calea>>, Updated Oct. 11, 2023, 9 pages.

* cited by examiner

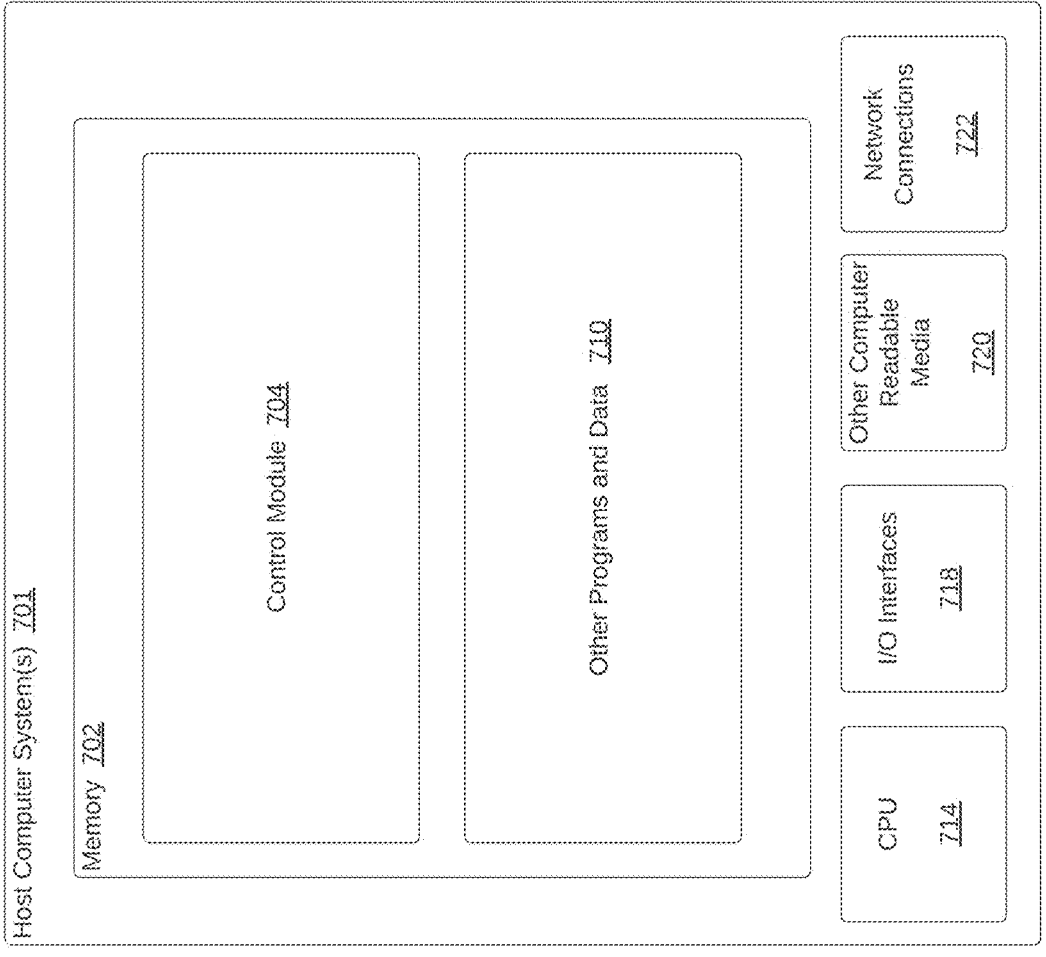
Fig. 7

SYSTEMS AND METHODS FOR A MULTIPLE MESSAGING SERVICE MANAGEMENT (MMSM) GATEWAY SEPARATING DIFFERENT TYPES OF WIRELESS NETWORK TRAFFIC FOR LAW ENFORCEMENT INTERCEPTION

BRIEF SUMMARY

The Communications Assistance for law Enforcement Act (CALEA) is a statute enacted by U.S. Congress in 1994 to require that telecommunications carriers and manufacturers of telecommunications equipment design their equipment, facilities, and services to ensure that they have the necessary surveillance capabilities to comply with legal requests for information. CALEA is intended to preserve the ability of law enforcement agencies to conduct electronic surveillance while protecting the privacy of information outside the scope of the investigation.

Lawful interception (LI) refers to the facilities in telecommunications and telephone networks that allow law enforcement agencies with court orders or other legal authorization to selectively wiretap individual subscribers. Most countries require licensed telecommunications operators to provide their networks with Legal Interception gateways and nodes for the interception of communications. The interfaces of these gateways have been standardized by telecommunication standardization organizations. Governments require phone service providers to install a legal interception gateway (LIG), along with legal interception nodes (LIN), which allow them to intercept in real-time the phone calls, messages, emails and some file transfers or instant messages. Thus, it may be the case that various law enforcement agencies may need to perform a law enforcement tap to intercept voice, text, image and/or video content sent from or to one or more wireless service subscribers of a mobile network operator pursuant to a valid warrant. However, voice, text, image and/or video content are traditionally received together by the law enforcement agency system when receiving data pursuant to such requests, making it a burden for the law enforcement agency system to separate out the relevant voice, text, image and/or video content.

To solve the above problem, in an example embodiment, a Multiple Messaging Service Management (MMSM) gateway (e.g., a Short Message Peer-to-Peer (SMPP) gateway) (From here on referred to as MMSM Gateway) receives one or more law enforcement agency data intercept requests for one or more wireless service subscribers of a mobile network operator. The MMSM gateway may receive one or more law enforcement agency data intercept requests from a law enforcement agency system for one or more wireless service subscribers via signaling over an X1 interface in a fifth generation (5G) wireless network. When receiving SMS and MMS communications, the MMSM gateway will then determine whether users sending or receiving such communications are subjects (i.e., targets) of at least one of the law enforcement agency data intercept requests. The MMSM gateway electronically separates out of the communications voice data, text data, image data and/or video data from the communications (e.g., in response to determining that the user sending and/or the user receiving the communication is the subject of at least one of the law enforcement agency data intercept requests). Also, in response to determining that the user sending and/or the user receiving the communication is the subject of at least one of the law enforcement agency data intercept requests, the MMSM gateway sends the separated out voice data (e.g., referring to any data characterizing: message deposit indicator, message deposit count, calling number or numbers depositing the message or messages, speech to text, or anything else from a VM system sent as data, etc.), text data, image data and/or video data to one or more law enforcement agencies associated with the applicable law enforcement agency data intercept request(s). The sending carrier or receiving carrier may be the same mobile network operator or two or more different mobile network operators but they will exchange traffic using the SMPP gateway in the "star" configuration as illustrated in FIG. 1. Thus, the gateway aggregates the connection point and the applicable law enforcement agency does not need to bear the burden of separating out such traffic.

BRIEF DESCRIPTION OF THE DRAWINGS

FIG. 7 shows a system diagram that describes an example implementation of computing system(s) for implementing embodiments described herein.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
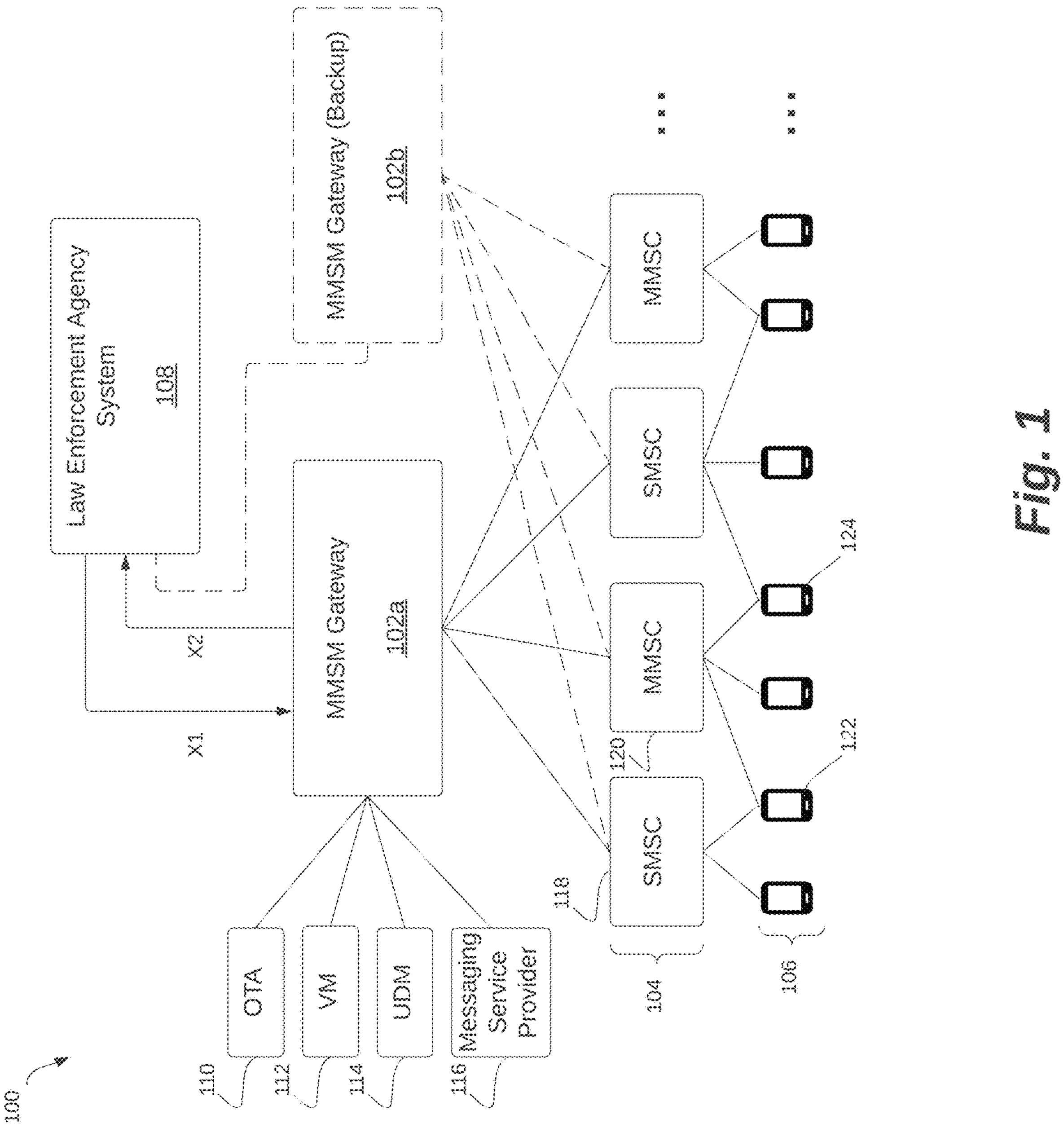
FIG. 1 illustrates a system for a Multiple Message Service Management (MMSM) gateway separating different types of wireless network traffic for law enforcement interception accordance with embodiments described herein.

FIG. 1 illustrates a system 100 for a MMSM gateway separating different types of wireless network traffic for law enforcement interception accordance with embodiments described herein.

Shown in FIG. 1 is a portion of a wireless mobile network including an MMSM gateway 102*a* (which also may be referred to as an MMSM aggregator or a Routing Entity (RE)). The MMSM gateway 102*a* may be used to bridge between applications and the wireless mobile network's SMS Center(s) (SMSCs) and Multimedia Message Service Center(s) (MMSCs) 104. For example, such applications may include, but are not limited to: an over-the-air (OTA) update application 110, voicemail (VM) application 112, Unified Data Management (UDM) application 114 and a messaging service provider application 116. Such applications may need to send and/or receive SMS and/or Multimedia Message Service (MMS) messages via the MMSM gateway 102*a*. Additional or different applications using the MMSM gateway 102*a* may also be present in various embodiments. Also, in various embodiments there may be fewer or additional SMSCs and MMSCs connected to the MMSM Gateway 102*a* and fewer or additional user equipment devices (UE) 106 connected to respective SMSCs and MMSCs 104.

The SMSC 118 is the portion of the wireless mobile network that handles text message operations. It is responsible for receiving, storing, routing and forwarding SMS messages from mobile handsets and other cellular enabled devices, such as UE 106. An SMSC may also be referred to as a short message service-service center (SMS-SC). One or more SMSCs are involved with all SMS messages. In an example message flow, an SMS message is sent by a cellular enabled device, such as UE 122, to a recipient device, such as UE 124. This SMS message is first routed through the SMSC 118. The SMSC 118 responds to the UE 122 with a small message indicating it accepted the SMS message. The SMSC 118 then determines if the recipient UE (e.g., UE 124) is available to receive the SMS message. If it is not available, the SMSC 118 will store the message. When the recipient is online the SMSC 118 will send the message to the recipient UE 124.

The SMSC 118 is also connected to and works with the MMSM gateway 102*a*. The MMSM gateway 102*a* also allows text messages to travel between networks and from an into different applications, such as OTA update application 110, VM application 112, UDM application 114 and messaging service provider application 116. For example, this allows SMS messages to be sent and received by email or to be automatically sent by programs. If the recipient is not in the same network, the SMSC 18 forwards the SMS message (via MMSM gateway 102*a*) to the correct network's SMSC.

The MMSC 120 is the telecommunication carrier's (e.g., a mobile network operator's) MMS store and forward server. MMS messages are delivered in a different way from SMS messages. The first step is for the sending device (e.g., UE 122) to encode the multimedia content in a fashion similar to sending a Multipurpose Internet Mail Extensions (MIME) message. The message is then forwarded to MMSC 120. The MMSC 120 is also connected to and works with the MMSM gateway 102*a*. The MMSM gateway 102*a* also allows MMS messages to travel between networks and from an into different applications. If the receiver is on a carrier different from the sender, then the MMSC 120 acts as a relay, and forwards the message (via the MMSM Gateway 102*a*) to the MMSC of the recipient's carrier using the Internet.

As a result, the MMSM gateway 102*a* provides a means of sending and receiving SMS and MMS traffic between applications and wireless mobile network users, such as those using user equipment (UE) 106. Providers of MMSM gateway services may include SMS aggregators and mobile network operators. Thus, in one example embodiment, UE 106 are operably connected via a radio access network (RAN) to the various respective SMSC and MMSC 104. Different applications, such as OTA update application 110, VM application 112, UDM application 114 and messaging service provider application 116 are also operably connected to the MMSM gateway 102*a* such that they may work with the MMSM gateway 102*a* to send and receive SMS and MMS messages to and from UE 106. An MMSM gateway backup 102*b* may also be present and ready to automatically come online in various embodiments to provide a backup to the MMSM gateway 102*a* in case MMSM gateway 102*a* fails for any reason.

One example of an MMSM gateway, such as MMSM gateway 102*a*, is a short Message Peer-to-Peer (SMPP) gateway. SMPP is used as an access protocol, or SMS application programming interface (API), by various SMS gateways. Other SMS APIs such as HyperText Transfer Protocol (HTTP), Simple Mail Transfer Protocol (SMTP) and Extensible Markup Language (XML) may also be used. SMPP is often preferable to these other SMS APIs because it is more useful where significant volumes of SMS messages are sent and/or received, when an industry standard protocol is preferable for development and maintenance purposes, or when vendor lock-in must be avoided. In SMPP terminology, an MMSM gateway may be referred to as a Routing Entity (RE). However, an SMPP gateway may be referred to as an External Short Message Entity (ESME) in the context of the SMPP communication with an SMSC.

Shown connected to the MMSM gateway 102*a* is an example computerized law enforcement agency system 108. In various embodiments, there may be additional or different law enforcement agency systems connected to MMSM gateway 102*a* corresponding to different law enforcement agencies. The MMSM gateway 102*a* may in some embodiments be or comprise part of a legal interception gateway (LIG). It may be the case that various law enforcement agencies may need to perform a law enforcement tap to intercept voice, text, image and/or video content sent from or to one or more wireless service subscribers of a mobile network operator pursuant to a valid warrant. However, voice, text, image and/or video content are traditionally received together by the law enforcement agency system 108 when receiving data pursuant to such requests, making it a burden for the law enforcement agency system 108 to separate out the relevant voice, text, image and/or video content.

To solve the above problem, in an example embodiment, the MMSM gateway 102*a* electronically receives one or more law enforcement agency data intercept requests for one or more wireless service subscribers of a mobile network operator, such as that of the wireless mobile network shown in system 100. In an example embodiment, the MMSM gateway 102*a* may receive one or more law enforcement agency data intercept requests from law enforcement agency system 108 for one or more wireless service subscribers via signaling over an X1 interface in a fifth generation (5G) wireless network. When receiving SMS and MMS communications, the MMSM gateway 102*a* will then determine whether users sending or receiving such communications are subjects (i.e., targets) of at least one of the one or more law enforcement agency data intercept requests.

For example, the intercept request received from law enforcement agency system 108 may target the user of UE 122. Then, when MMSM gateway 102*a* receives communications from UE 122 via SMSC 118 and/or MMSC 120, MMSM gateway 102*a* will electronically separate out of the communications the voice data, text data, image data and/or video data from the communications. This may be in response to receiving the communications from UE 122 via SMSC 118 and/or MMSC 120, or may be in response to determining the user associated with UE 122 is the subject of one or more of the law enforcement agency data intercept requests received from law enforcement agency system 108.

The MMSM gateway 102*a* may then electronically send (e.g., via the X2 interface in a 5G network) the separated out at voice data, text data image data and/or video data to the respective law enforcement agency system that made the applicable law enforcement intercept request, such as law enforcement agency system 108. In an example embodiment, the communications to be intercepted may include SMS traffic and MMS traffic. MMSM gateway 102*a* may electronically separate out of the communications the SMS traffic and the MMS traffic. The MMSM gateway 102*a* may then electronically send a separate feed to the law enforcement agency system 108 for the SMS traffic and send a separate feed to the law enforcement agency system 108 for the MMS traffic. In one example, sending the data from the MMSM gateway 102*a* to the law enforcement agency system 108 may include a communication indicating a network address at which MMS data of the MMS traffic is stored that a legal intercept interface of the law enforcement agency system 108 uses to download just the MMS data. For example, the content may be extracted and sent to a temporary storage server with an HTTP front-end that is accessible by the law enforcement agency system 108.

Figure 2:
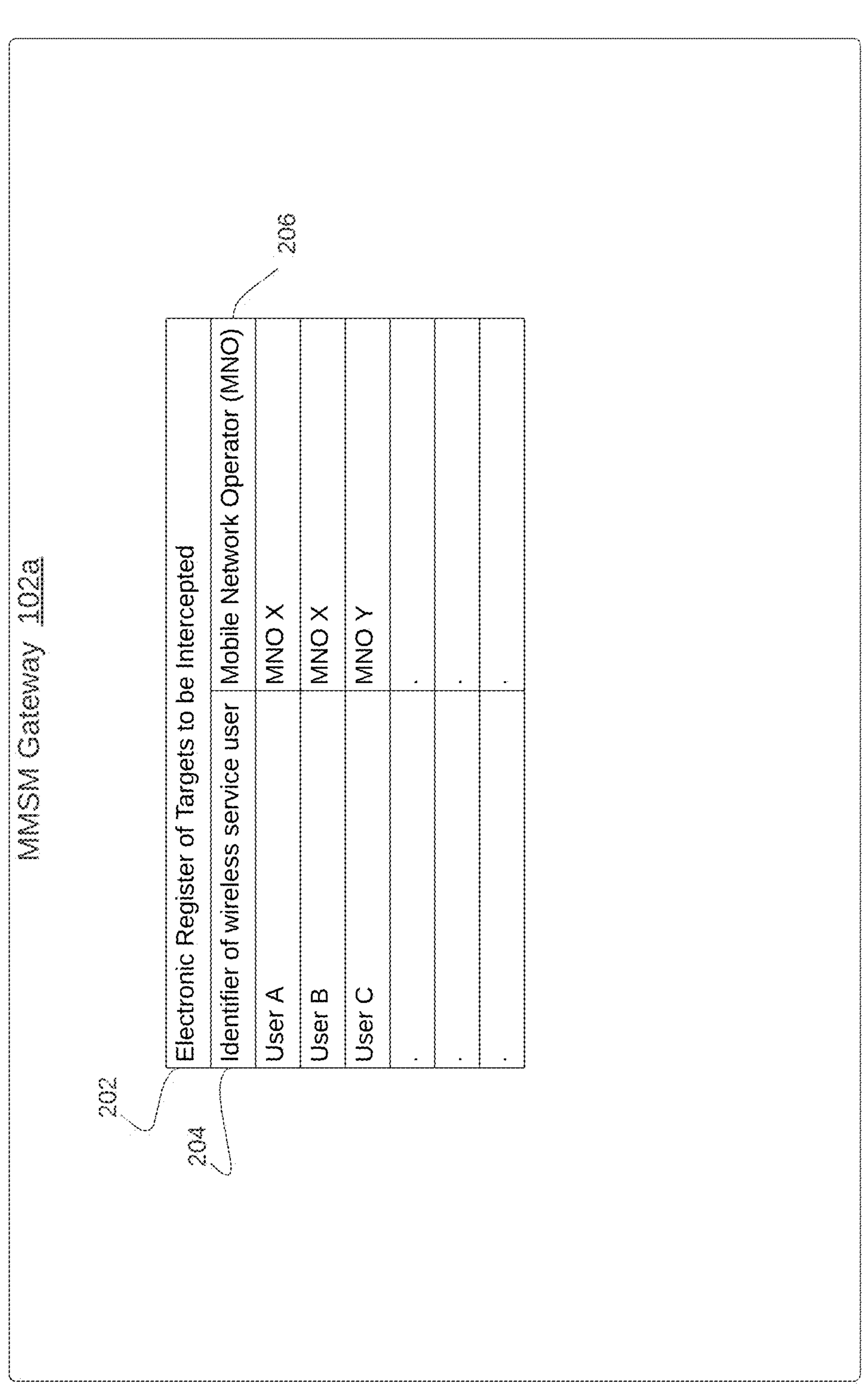
FIG. 2 is a diagram on an example MMSM gateway including an electronic register of targets to be intercepted in accordance with embodiments described herein.

FIG. 2 is a diagram on example MMSM gateway 102*a* including an electronic register of targets to be intercepted in accordance with embodiments described herein.

Based on receiving the one or more law enforcement agency data intercept requests from law enforcement agency system 108 (shown in FIG. 1), the MMSM gateway 102*a* may store, maintain, update and/or otherwise have electronic access to an electronic register of targets to be intercepted 202. The electronic register of targets to be intercepted 202 may include identifiers of the wireless service users which are the subjects of the law enforcement agency data intercept requests. In various embodiments, the identifier of the wireless service user 204 may include or be based on one or more of: a user name, a user account number, a subscriber identity module (SIM) card, a phone number, a UE identifier, an International Mobile Subscriber Identity (IMSI), a Subscription Permanent Identifier (SUPI), Subscription Concealed Identifier (SUCI), a Globally Unique Temporary Identifier (GUTI) an International Mobile Equipment Identity (IMEI) code, a Permanent Equipment Identity (PEI) code, a Temporary Mobile Subscriber Identity (TMSI) code, and a Packet Temporary Mobile Subscriber Identity (P-TMSI) code, etc.

In some embodiments, the electronic register of targets to be intercepted 202 may also store other potentially relevant data, such as an identity or identifier of the mobile network operator (MNO) 206 to which the UE of the associated user is subscribed or registered. In various embodiments, there may be fewer or additional users and MNOs identified in the electronic register of targets to be intercepted 202. Also, is some embodiments, the register of targets to be intercepted 202 may be located remotely from the MMSM gateway 102*a*, such as at a secure remote server or other secure location electronically accessible by the MMSM gateway 102*a*.

In response to receiving the communications from a sender wireless service user to a recipient wireless service user, the MMSM gateway 102*a* may access the electronic register of targets to be intercepted 202 to determine whether an identifier of the sender wireless service user and/or recipient wireless service user is in the electronic register of targets to be intercepted 202. The MMSM gateway 102*a* may then determine whether the sender wireless service user and/or recipient wireless service user is a subject of at least one of the law enforcement agency data intercept requests. This may be based on whether an identifier of the sender wireless service user and/or recipient wireless service user is in the electronic register of targets to be intercepted 202.

Figure 3:
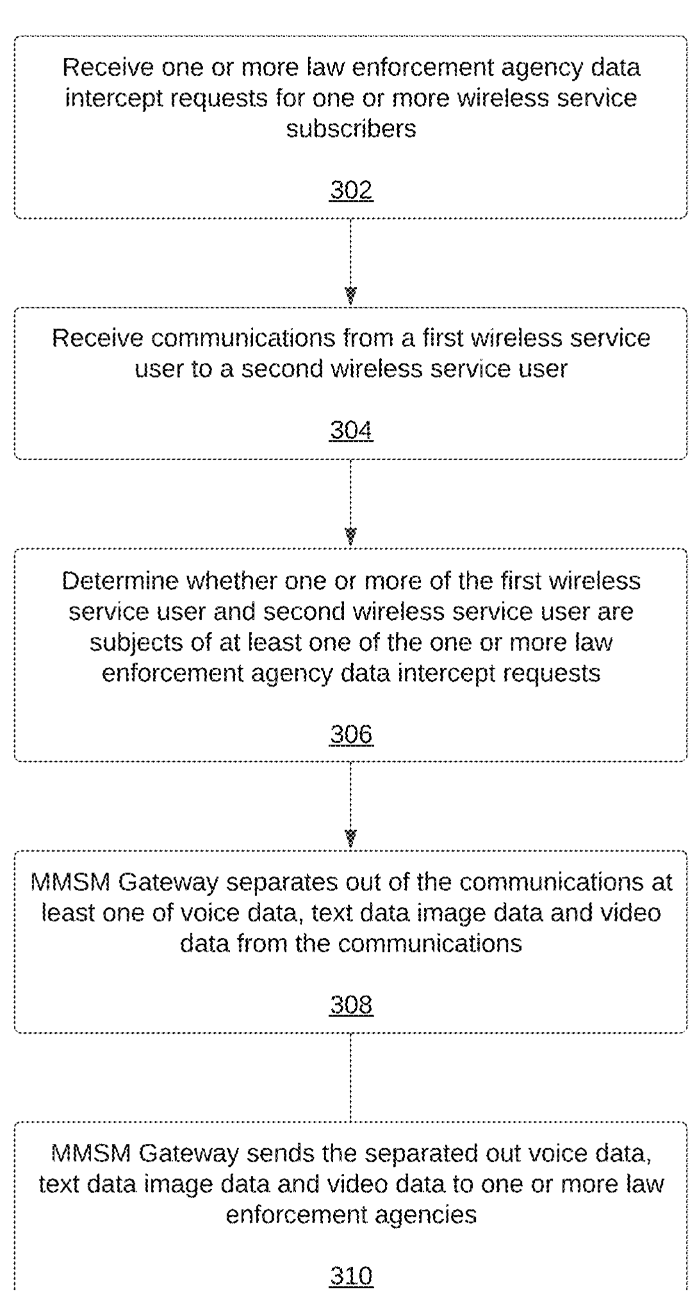
FIG. 3 illustrates a logical flow diagram showing an example embodiment of a process for electronically sending the separated out voice data, text data, image data and video data to one or more law enforcement agencies in accordance with embodiments described herein.

FIG. 3 illustrates a logical flow diagram showing an example embodiment of a process 300 for electronically sending the separated out voice data, text data, image data and video data to one or more law enforcement agencies in accordance with embodiments described herein.

At 302, the MMSM gateway 102*a* receives one or more law enforcement agency data intercept requests for one or more wireless service subscribers of a mobile network operator. For example, this may be via signaling over an X1 interface in a fifth generation (5G) wireless network. In an example embodiment, the SMS gateway is a an SMPP gateway.

At 304, the MMSM gateway 102*a* receives communications from a first wireless service user to a second wireless service user. This may include receiving, by the MMSM gateway, communications from a Multimedia Messaging Service Center (MMSC) and/or receiving, by the MMSM gateway, communications from a Short Messaging Service Center (SMSC).

At 306, the MMSM gateway 102*a* determines whether one or more of the first wireless service user and second wireless service user are subjects of at least one of the one or more law enforcement agency data intercept requests.

At 308, the MMSM gateway 102*a* electronically separates out of the communications at least one of voice data, text data, image data and video data from the communications. Separating out of the communications at least one of voice data, text data, image data and video data from the communications may include: the MMSM gateway electronically separating out voice data from the communications; the MMSM gateway electronically separating out text data from the communications; the MMSM gateway electronically separating out image data from the communications; and/or the MMSM gateway electronically separating out video data from the communications. In one embodiment, the separating out of the communications at least one of voice data, text data, image data and video data from the communications is in response to receiving the communications from the first wireless service user to the second wireless service user. In another embodiment, the separating out of the communications at least one of voice data, text data, image data and video data from the communications is in response to determining one or more of the first wireless service user and the second wireless service user are subjects of one or more of the law enforcement agency data intercept requests.

At 310, the MMSM gateway 102*a*, in response to determining one or more of the first wireless service user and the second wireless service user are subjects of at least one of the one or more law enforcement agency data intercept requests, electronically sends the separated out at least one of voice data, text data, image data and video data to one or more law enforcement agencies associated with the at least one of the one or more law enforcement agency data intercept requests. For example, sending the separated out at least one of voice data, text data, image data and video data to one or more law enforcement agencies may be via signaling over an X2 interface in a fifth generation (5G) wireless network.

Figure 4:
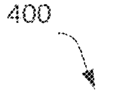
FIG. 4 illustrates a logical flow diagram showing an example embodiment of a process, useful in the process of FIG. 3, for sending the separated out voice data, text data, image data or video data in accordance with embodiments described herein.
Figure 4:
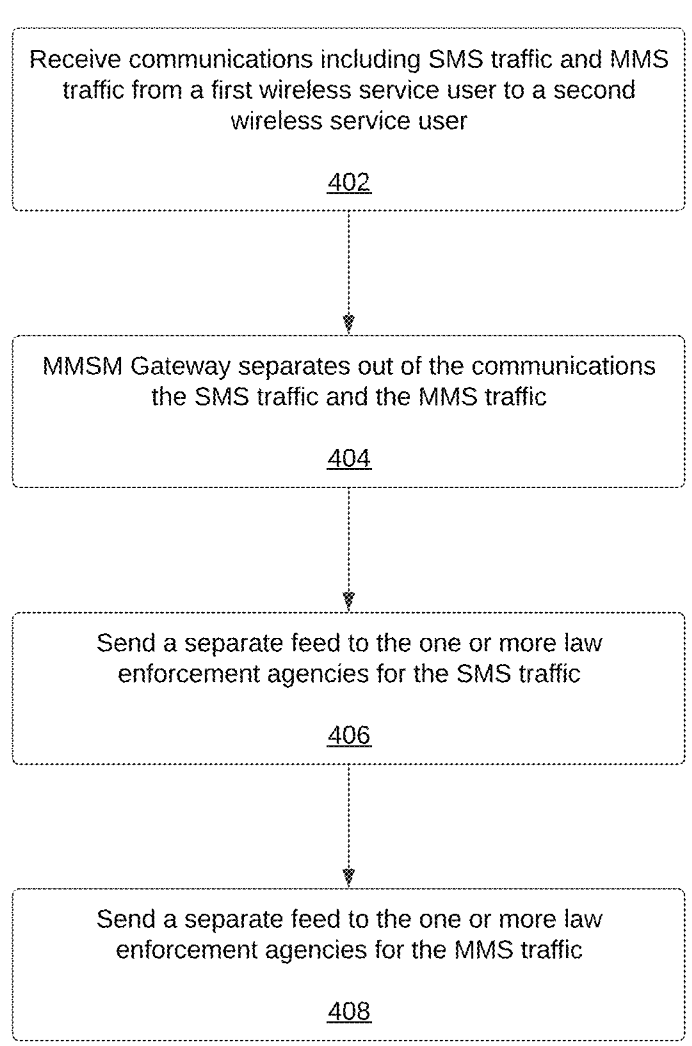

FIG. 4 illustrates a logical flow diagram showing an example embodiment of a process 400, useful in the process 300 of FIG. 3, for sending the separated-out voice data, text data, image data or video data in accordance with embodiments described herein.

At 402, the MMSM gateway 102*a* receives communications including Short Message Service (SMS) traffic and Multimedia Messaging Service (MMS) traffic from a first wireless service user to a second wireless service user.

At 404, the MMSM gateway 102*a* electronically separates out of the communications the SMS traffic and the MMS traffic.

At 406, the MMSM gateway 102*a* sends a separate feed to the one or more law enforcement agencies for the SMS traffic.

At 408, the MMSM gateway 102*a* sends a separate feed to the one or more law enforcement agencies for the MMS traffic.

Figure 5:
FIG. 5 illustrates a logical flow diagram showing an example embodiment of a process, useful in the process of FIG. 3, for sending the separated-out voice data, text data, image data or video data involving indicating a network address at which MMS data of MMS traffic is stored in accordance with embodiments described herein.
Figure 5:
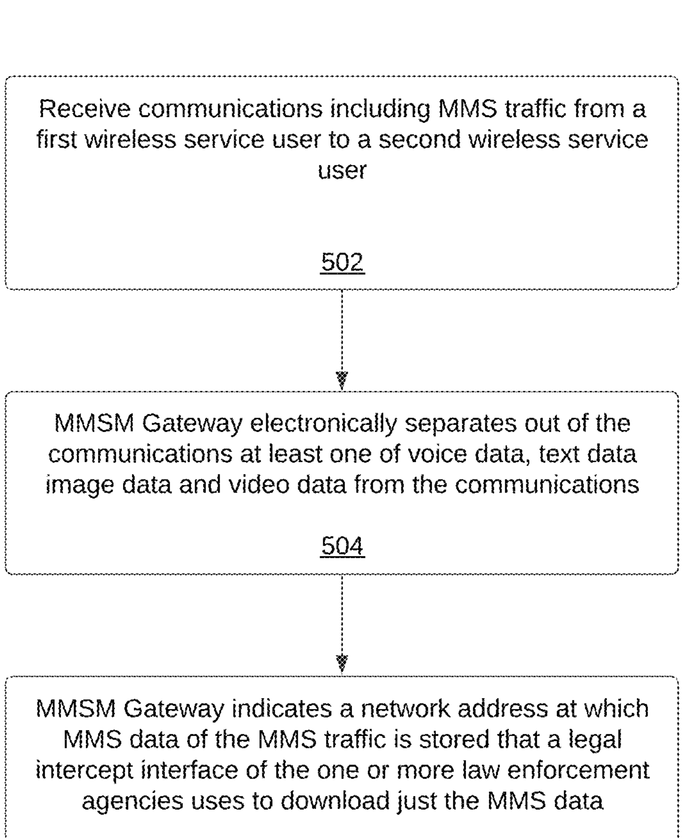

FIG. 5 illustrates a logical flow diagram showing an example embodiment of a process 500, useful in the process 300 of FIG. 3, for sending the separated out voice data, text data, image data or video data involving indicating a network address at which MMS data of MMS traffic is stored in accordance with embodiments described herein.

At 502, the MMSM gateway 102*a* receives communications including Multimedia Messaging Service (MMS) traffic from a first wireless service user to a second wireless service user.

At 504, the MMSM gateway 102*a* electronically separates out of the communications at least one of voice data, text data, image data and video data from the communications.

At 506, the MMSM gateway 102*a* electronically indicates to the one or more law enforcement agencies associated with the at least one of the one or more law enforcement agency data intercept requests a network address at which MMS data of the MMS traffic is stored that a legal intercept interface of the one or more law enforcement agencies uses to download just the MMS data.

Figure 6:
FIG. 6 illustrates a logical flow diagram showing an example embodiment of a process, useful in the process of FIG. 3, for determining whether wireless service users are subjects of at least one law enforcement agency data intercept request in accordance with embodiments described herein.
Figure 6:
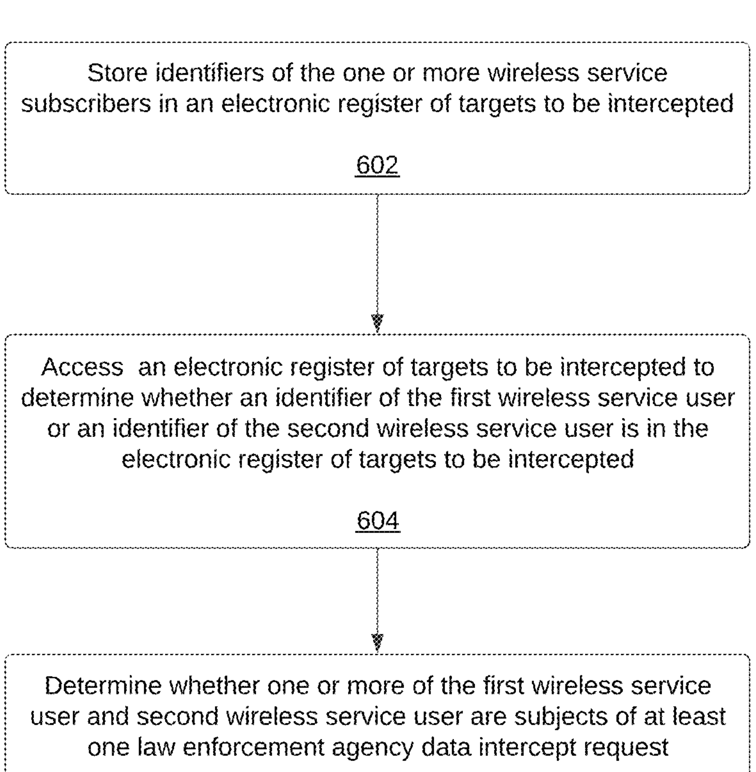

FIG. 6 illustrates a logical flow diagram showing an example embodiment of a process 600, useful in the process 300 of FIG. 3, for determining whether wireless service users are subjects of at least one law enforcement agency data intercept request in accordance with embodiments described herein.

At 602, the MMSM gateway 102*a*, based on receiving the one or more law enforcement agency data intercept requests for one or more wireless service subscribers of a mobile network operator, stores identifiers of the one or more wireless service subscribers in an electronic register of targets to be intercepted.

At 604, the MMSM gateway 102*a*, in response to receiving the communications from the first wireless service user to the second wireless service user, accesses the electronic register of targets to be intercepted to determine whether an identifier of the first wireless service user or an identifier of the second wireless service user is in the electronic register of targets to be intercepted.

At 606, the MMSM gateway 102*a* determines whether one or more of the first wireless service user and second wireless service user are subjects of at least one of the one or more law enforcement agency data intercept requests based on whether an identifier of first wireless service user or the second wireless service user is in the electronic register of targets to be intercepted.

FIG. 7 shows a system diagram that describes an example implementation of computing system(s) for implementing embodiments described herein.

The functionality described herein for systems and methods for an MMSM gateway separating different types of wireless network traffic for law enforcement interception, or components thereof, can be implemented either on dedicated hardware, as a software instance running on dedicated hardware, or as a virtualized function instantiated on an appropriate platform, e.g., a cloud infrastructure. In some embodiments, such functionality may be completely software-based and designed as cloud-native, meaning that they're agnostic to the underlying cloud infrastructure, allowing higher deployment agility and flexibility. However, FIG. 7 illustrates an example of underlying hardware on which such software and functionality may be hosted and/or implemented.

In particular, shown is example host computer system(s) 701. For example, such computer system(s) 701 may represent one or more of those in various data centers, base stations and cell sites that are, or that host or implement the functions of, aspects described herein to implement systems and methods for an MMSM gateway separating different types of wireless network traffic for law enforcement interception. In some embodiments, one or more special-purpose computing systems may be used to implement the functionality described herein. Accordingly, various embodiments described herein may be implemented in software, hardware, firmware, or in some combination thereof. Host computer system(s) 701 may include memory 702, one or more central processing units (CPUs) 714, I/O interfaces 718, other computer-readable media 720, and network connections 722.

Memory 702 may include one or more various types of non-volatile and/or volatile storage technologies. Examples of memory 702 may include, but are not limited to, flash memory, hard disk drives, optical drives, solid-state drives, various types of random access memory (RAM), various types of read-only memory (ROM), neural networks, other computer-readable storage media (also referred to as processor-readable storage media), or the like, or any combination thereof. Memory 702 may be utilized to store information, including computer-readable instructions that are utilized by CPU 714 to perform actions, including those of embodiments described herein.

Memory 702 may have stored thereon control module(s) 704. The control module(s) 704 may be configured to implement and/or perform some or all of the functions of the systems, components and modules described herein to implement systems and methods for an MMSM gateway separating different types of wireless network traffic for law enforcement interception. Memory 702 may also store other programs and data 710, which may include rules, databases, application programming interfaces (APIs), software containers, nodes, pods, software defined data centers (SDDCs), microservices, virtualized environments, software platforms, cloud computing service software, network management software, network orchestrator software, network functions (NF), artificial intelligence (AI) or machine learning (ML) programs or models to perform the functionality described herein, user interfaces, operating systems, other network management functions, other NFs, etc.

Network connections 722 are configured to communicate with other computing devices to facilitate the functionality described herein. In various embodiments, the network connections 722 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 718 may include a video interfaces, other data input or output interfaces, or the like. Other computer-readable media 720 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method comprising:

receiving, by a Multiple Messaging Service Management (MMSM) gateway, one or more law enforcement agency data intercept requests for one or more wireless service subscribers of a mobile network operator;

receiving, by the MMSM gateway, communications from a first wireless service user to a second wireless service user;

determining, by the MMSM gateway, whether one or more of the first wireless service user and second wireless service user are subjects of at least one of the one or more law enforcement agency data intercept requests;

the MMSM gateway electronically separating out of the communications at least one of voice data, text data, image data and video data from the communications; and in response to determining one or more of the first wireless service user and the second wireless service user are subjects of at least one of the one or more law enforcement agency data intercept requests, electronically sending, by the MMSM gateway, the separated out at least one of voice data, text data, image data and video data to one or more law enforcement agencies associated with the at least one of the one or more law enforcement agency data intercept requests.

2. The method of claim 1 wherein the MMSM gateway is a Short Message Peer-to-Peer (SMPP) gateway.

3. The method of claim 1 wherein the separating out of the communications at least one of voice data, text data, image data and video data from the communications includes:

the MMSM gateway electronically separating out voice data from the communications;

the MMSM gateway electronically separating out text data from the communications;

the MMSM gateway electronically separating out image data from the communications; and the MMSM gateway electronically separating out video data from the communications.

4. The method of claim 1 wherein the receiving, by the MMSM gateway, communications from a first wireless service user to a second wireless service user includes:

receiving, by the MMSM gateway, communications from a Multimedia Messaging Service Center (MMSC); and receiving, by the MMSM gateway, communications from a Short Messaging Service Center (SMSC).

5. The method of claim 1 wherein:

the communications include Short Message Service (SMS) traffic and Multimedia Messaging Service (MMS) traffic;

the MMSM gateway electronically separating out of the communications at least one of voice data, text data, image data and video data from the communications includes separating out of the communications the SMS traffic and the MMS traffic; and electronically sending, by the MMSM gateway, the separated out at least one of voice data, text data, image data and video data to one or more law enforcement agencies includes:

sending a separate feed to the one or more law enforcement agencies for the SMS traffic; and sending a separate feed to the one or more law enforcement agencies for the MMS traffic.

6. The method of claim 1 wherein:

the communications include Multimedia Messaging Service (MMS) traffic; and the electronically sending, by the MMSM gateway, the separated out at least one of voice data, text data, image data and video data to one or more law enforcement agencies includes indicating a network address at which MMS data of the MMS traffic is stored that a legal intercept interface of the one or more law enforcement agencies associated with the at least one of the one or more law enforcement agency data intercept requests uses to download just the MMS data.

7. The method of claim 1 wherein the separating out of the communications at least one of voice data, text data, image data and video data from the communications is in response to receiving the communications from the first wireless service user to the second wireless service user.

8. The method of claim 1 wherein the separating out of the communications at least one of voice data, text data, image data and video data from the communications is in response to determining one or more of the first wireless service user and the second wireless service user are subjects of one or more of the law enforcement agency data intercept requests.

9. The method of claim 1 wherein the determining, by the MMSM gateway, whether one or more of the first wireless service user and second wireless service user are subjects of at least one of the one or more law enforcement agency data intercept requests includes:

based on receiving the one or more law enforcement agency data intercept requests for one or more wireless service subscribers of a mobile network operator, storing identifiers of the one or more wireless service subscribers in an electronic register of targets to be intercepted;

in response to receiving the communications from the first wireless service user to the second wireless service user, accessing the electronic register of targets to be intercepted to determine whether an identifier of the first wireless service user or an identifier of the second wireless service user is in the electronic register of targets to be intercepted; and determining whether one or more of the first wireless service user and second wireless service user are subjects of at least one of the one or more law enforcement agency data intercept requests based on whether an identifier of first wireless service user or the second wireless service user is in the electronic register of targets to be intercepted.

10. The method of claim 1 wherein the receiving the one or more law enforcement agency data intercept requests for one or more wireless service subscribers of a mobile network operator includes receiving, by the MMSM gateway, the one or more law enforcement agency data intercept requests via signaling over an X1 interface in a fifth generation (5G) wireless network.

11. The method of claim 1 wherein the sending the separated out at least one of voice data, text data, image data and video data to one or more law enforcement agencies includes sending, by the MMSM gateway, the separated out at least one of voice data, text data, image data and video data to one or more law enforcement agencies via signaling over an X2 interface in a fifth generation (5G) wireless network.

12. A system comprising:

at least one memory that stores computer executable instructions; and at least one processor that executes the computer executable instructions to cause operations to be performed, the operations including:

receiving, by a Multiple Messaging Service Management (MMSM) gateway, one or more law enforcement agency data intercept requests for one or more wireless service subscribers of a mobile network operator;

receiving, by the MMSM gateway, communications from a first wireless service user to a second wireless service user;

determining, by the MMSM gateway, whether one or more of the first wireless service user and second wireless service user are subjects of at least one of the one or more law enforcement agency data intercept requests;

the MMSM gateway electronically separating out of the communications at least one of voice data, text data, image data and video data from the communications; and in response to determining one or more of the first wireless service user and the second wireless service user are subjects of at least one of the one or more law enforcement agency data intercept requests, electronically sending, by the MMSM gateway, the separated out at least one of voice data, text data, image data and video data to one or more law enforcement agencies associated with the at least one of the one or more law enforcement agency data intercept requests.

13. The system of claim 12 wherein the MMSM gateway is a Short Message Peer-to-Peer (SMPP) gateway.

14. The system of claim 12 wherein the separating out of the communications at least one of voice data, text data, image data and video data from the communications includes:

the MMSM gateway electronically separating out voice data from the communications;

the MMSM gateway electronically separating out text data from the communications;

the MMSM gateway electronically separating out image data from the communications; and the MMSM gateway electronically separating out video data from the communications.

15. The system of claim 12 wherein the receiving, by the MMSM gateway, communications from a first wireless service user to a second wireless service user includes:

receiving, by the MMSM gateway, communications from a Multimedia Messaging Service Center (MMSC); and receiving, by the MMSM gateway, communications from a Short Messaging Service Center (SMSC).

16. The system of claim 12 wherein:

the communications include Short Message Service (SMS) traffic and Multimedia Messaging Service (MMS) traffic;

the MMSM gateway electronically separating out of the communications at least one of voice data, text data, image data and video data from the communications includes separating out of the communications the SMS traffic and the MMS traffic; and electronically sending, by the MMSM gateway, the separated out at least one of voice data, text data, image data and video data to one or more law enforcement agencies includes:

sending a separate feed to the one or more law enforcement agencies for the SMS traffic; and sending a separate feed to the one or more law enforcement agencies for the MMS traffic.

17. A non-transitory computer-readable storage medium having computer-executable instructions stored thereon that, when executed by at least one processor, cause the at least one processor to cause actions to be performed, the actions including:

receiving, by a MMSM gateway, one or more law enforcement agency data intercept requests for one or more wireless service subscribers of a mobile network operator;

receiving, by the MMSM gateway, communications from a first wireless service user to a second wireless service user;

determining, by the MMSM gateway, whether one or more of the first wireless service user and second wireless service user are subjects of at least one of the one or more law enforcement agency data intercept requests;

the MMSM gateway electronically separating out of the communications at least one of voice data, text data, image data and video data from the communications; and in response to determining one or more of the first wireless service user and the second wireless service user are subjects of at least one of the one or more law enforcement agency data intercept requests, electronically sending, by the MMSM gateway, the separated out at least one of voice data, text data, image data and video data to one or more law enforcement agencies associated with the at least one of the one or more law enforcement agency data intercept requests.

18. The non-transitory computer-readable storage medium of claim 17 wherein the MMSM gateway is a Short Message Peer-to-Peer (SMPP) gateway.

19. The non-transitory computer-readable storage medium of claim 17 wherein the separating out of the communications at least one of voice data, text data, image data and video data from the communications includes:

the MMSM gateway electronically separating out voice data from the communications;

the MMSM gateway electronically separating out text data from the communications;

the MMSM gateway electronically separating out image data from the communications; and the MMSM gateway electronically separating out video data from the communications.

20. The non-transitory computer-readable storage medium of claim 17 wherein the receiving, by the MMSM gateway, communications from a first wireless service user to a second wireless service user includes:

receiving, by the MMSM gateway, communications from a Multimedia Messaging Service Center (MMSC); and receiving, by the MMSM gateway, communications from a Short Messaging Service Center (SMSC).

* * * * *